United States Patent
O'Hara et al.

(10) Patent No.: US 11,928,562 B2
(45) Date of Patent: Mar. 12, 2024

(54) FRAMEWORK FOR PROVIDING IMPROVED PREDICTIVE MODEL

(71) Applicant: Business Objects Software Limited, Dublin (IE)

(72) Inventors: Paul O'Hara, Dublin (IE); Ying Wu, Dublin (IE)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 797 days.

(21) Appl. No.: 17/023,051

(22) Filed: Sep. 16, 2020

(65) Prior Publication Data

US 2022/0083905 A1   Mar. 17, 2022

(51) Int. Cl.
*G06N 20/00* (2019.01)
*G06F 16/23* (2019.01)
*G06N 3/08* (2023.01)

(52) U.S. Cl.
CPC ......... *G06N 20/00* (2019.01); *G06F 16/2379* (2019.01); *G06N 3/08* (2013.01)

(58) Field of Classification Search
None
See application file for complete search history.

(56) References Cited

U.S. PATENT DOCUMENTS

2019/0325351 A1* 10/2019 Stein ............... G06F 16/955

OTHER PUBLICATIONS

Kiely TJ, Bastian ND. The Spatially-Conscious Machine Learning Model. arXiv e-prints. Feb. 2019:arXiv-1902. 17 pages. (Year: 2019).*
Lundberg SM, Lee SI. A unified approach to interpreting model predictions. Advances in neural information processing systems. 2017; 30. 10 pages. (Year: 2017).*
James G, Witten D, Hastie T, Tibshirani R. An introduction to statistical learning. New York: springer; Jun. 2013, corrected 8th printing 2017. 441 pages. (Year: 2017).*

* cited by examiner

*Primary Examiner* — Vincent Gonzales
(74) *Attorney, Agent, or Firm* — Buckley, Maschoff & Talwalkar LLC

(57) ABSTRACT

A system and method include input of data records to a first trained predictive model to obtain a predicted value associated with each input data record. A model region is then associated with each of the input data records based on the first trained predictive model, the input data records and the predicted values. Enhanced input data records are generated by, for each model region, adding derived values of engineered features associated with the model region to input data records associated with the model region and default values of the engineered features associated with the model region to input training records not associated with the model region. The enhanced input data records are input to a second trained predictive model to obtain an enhanced predicted value associated with each input data record.

12 Claims, 12 Drawing Sheets

| Target Bin | [100,90] | [90,80] | [80,70] | [70,60] | [60,50] | [50,40] | [40,30] | [30,20] | [20,10] | [10,0] |
|---|---|---|---|---|---|---|---|---|---|---|
| [100,90] | 1 | 0.96 | 0.9 | 0.4 | 0.5 | 0.3 | 0.25 | 0.1 | 0.1 | 0.1 |
| [90,80] | 0.96 | 1 | 0.83 | 0.3 | 0.4 | 0.2 | 0.4 | 0.3 | 0.1 | 0.1 |
| [80,70] | 0.9 | 0.83 | 1 | 0.5 | 0.45 | 0.45 | 0.39 | 0.28 | 0.27 | 0.23 |
| [70,60] | 0.4 | 0.3 | 0.5 | 1 | 0.5 | 0.5 | 0.4 | 0.4 | 0.1 | 0.1 |
| [60,50] | 0.5 | 0.4 | 0.45 | 0.5 | 1 | 0.3 | 0.3 | 0.2 | 0.2 | 0.2 |
| [50,40] | 0.3 | 0.2 | 0.43 | 0.5 | 0.3 | 1 | 0.4 | 0.4 | 0.4 | 0.4 |
| [40,30] | 0.25 | 0.4 | 0.39 | 0.4 | 0.3 | 0.4 | 1 | 0.2 | 0.2 | 0.1 |
| [30,20] | 0.1 | 0.3 | 0.28 | 0.4 | 0.2 | 0.4 | 0.2 | 1 | 0.2 | 0.2 |
| [20,10] | 0.1 | 0.1 | 0.23 | 0.1 | 0.2 | 0.4 | 0.2 | 0.2 | 1 | 0.2 |
| [10,0] | 0.1 | 0.1 | 0.27 | 0.1 | 0.2 | 0.04 | 0.2 | 0.2 | 0.2 | 1 |

*FIG. 9*

| Candidate Decision Boundary Region | Correlation Threshold |
|---|---|
| [10, 0] | 0.8, 0.95 |
| [20, 0] | 0.8, 0.95 |
| [30, 0] | 0.8, 0.95 |
| [40, 0] | 0.8, 0.95 |
| [50, 0] | 0.8, 0.95 |
| [60, 0] | 0.8, 0.95 |
| [70, 0] | 0.8, 0.95 |
| [80, 0] | 0.8, 0.95 |
| [90, 0] | 0.8, 0.95 |
| [100, 0] | 0.8, 0.95 |
| [100, 0], [90, 80], [80, 70] | 0.8 |
| [100, 90], [90, 80] | 0.95 |

*FIG. 10*

FRAMEWORK FOR PROVIDING IMPROVED PREDICTIVE MODEL

BACKGROUND

Supervised learning is a branch of machine learning in which a model is trained based on sets of training data, each of which is associated with a target output. More specifically, supervised learning algorithms train a model to map each set of training data to its associated target output within a suitable margin of error. The underlying rules of the trained model can then be extracted and used to predict an output based on a set of input data.

In the case of a regression model the target output may be a number while in the case of a classification model the target output may be a classification (e.g., Yes/No, a selection of one of several options). Such predictive models can be used in many applications such as pattern recognition, information retrieval, and forecasting. However, the usability of a trained predictive model is directly related to the accuracy of its predictive performance.

Advanced supervised learning algorithms have been proposed to improve accuracy of predictive models trained thereby. Even if these algorithms increase the overall accuracy of a trained predictive model (measured, for example, as Mean Absolute Error), such a trained predictive model will likely exhibit different accuracies for different target value intervals. That is, the predictions produced by the trained model within some target intervals may be more accurate than the predictions produced by the trained model within other target intervals.

Feature engineering is also used to improve the accuracy of a predictive model trained using supervised learning algorithms. Feature engineering includes the addition of dimensions, or features, to the sets of training data. The value of an added feature for a given set of data is typically derived from domain knowledge and/or from one or more values of other features of the given data set. However, if the values of the additional features exhibit a low correlation with the target values, the additional features will contribute noise to the supervised learning algorithm training process and may suppress any accuracy improvements otherwise-obtained via feature engineering.

BRIEF DESCRIPTION OF THE DRAWINGS

FIG. 9 illustrates determination of bin similarities according to some embodiments;

FIG. 10 illustrates determination of model region boundaries according to some embodiments;

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments provide a framework to improve the accuracy of a supervised learning-trained model by assigning record-specific engineered features to input training data. The assignment of record-specific engineered features is based on a model region determined for each record. According to some embodiments, input records which are assigned to a same model region of a trained model experience a similar mapping (i.e., transformation, conversion, operation, etc.) to the target output of the trained model. The resulting feature-enhanced input training data is used to train an enhanced model.

During deployment to determine a predicted output for each of a set of data records, a model region associated with each input data record is determined based on a trained classification model. Each input data record is enhanced with engineered features based on its associated model region as described above, and the feature-enhanced input data records are input to the trained enhanced model.

Some embodiments may therefore improve the accuracy of a predictive model by adding engineered features to training data in a manner which improves the accuracy of some (e.g., otherwise weaker) regions of the model while reducing the noise and data complexity associated with other training techniques employing engineered features.

Figure 1:
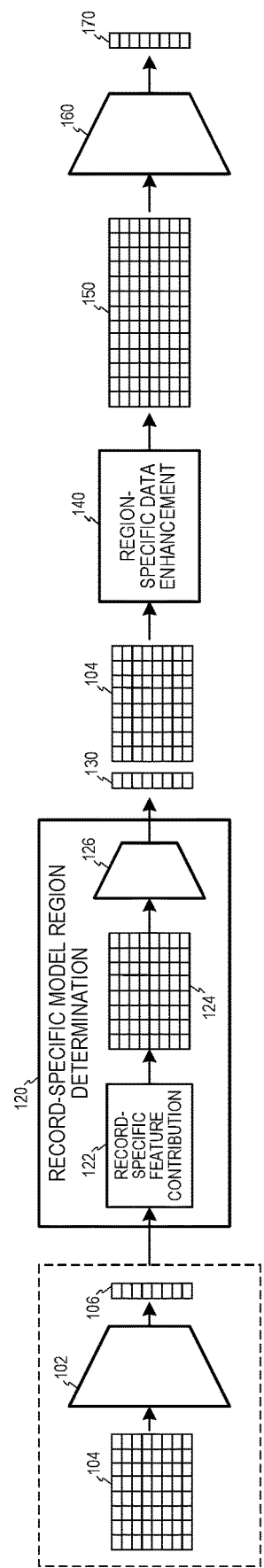
FIG. 1 is a block diagram of a prediction pipeline including a predictive model, a classification model trained according to some embodiments and an enhanced predictive model trained according to some embodiments.

FIG. 1 is a block diagram of a deployed prediction pipeline including a predictive model, a classification model trained according to some embodiments and an enhanced predictive model trained according to some embodiments. Each component of the pipeline may be implemented using any suitable combination of hardware and/or software, and elements of two or more components may be implemented by a same combination of hardware and/or software. Any components of the FIG. 1 pipeline may be implemented by a service executing on virtual machines deployed in the cloud.

FIG. 1 will now be briefly described in order to provide an introduction to some embodiments. A detailed description of training of the networks of FIG. 1 will then follow.

Trained predictive model 102 has been trained using historical records (i.e., input training data) and a supervised learning algorithm as is known in the art. The supervised learning algorithm may comprise a regression algorithm if model 102 is intended to predict a number based on a set of input data values. The supervised learning algorithm may comprise a classification algorithm if model 102 is intended to predict a category from a set of two or more known categories.

Model 102 may comprise any type of learning-compatible network, algorithm, decision tree, etc., that is or becomes known. For example, model 102 may comprise a network of neurons which receive input, change internal state according to that input, and produce output depending on the input and internal state. The output of certain neurons is connected to the input of other neurons to form a directed and weighted graph. The weights as well as the functions that compute the internal state are modified during training using supervised learning algorithms as is known.

Input data records 104 are input to trained model 102 for the purpose of obtaining corresponding predicted values. Each of input data records 104 includes the same features (e.g., columns) as the training data used to train model 102. In this regard, the training data may have been enhanced with global derived features as is known in the art. If so, input data records 104 are similarly enhanced prior to input to model 102.

Trained model 102 operates to output a predicted value for each input data record 104. For example, output vector 106 contains the predicted value for each row of input data records 104. Trained model 102, input data records 104 and output vector 106 are then passed to record-specific model region determination component 120.

Record-specific model region determination component 120 determines a region of model 102 associated with each input data record 104. A model region may be considered as a mapping provided by a trained model between a particular space of input values to a particular space of predicted values. Certain mappings of the trained model may be more accurate than other mappings, and some embodiments provide a framework to improve the less-accurate mappings while minimally affecting the more-accurate mappings.

Record-specific model region determination component 120 may employ any suitable system to determine a region of model 102 associated with each input data record 104. In the embodiment of FIG. 1, trained model 102, input data records 104 and output vector 106 are input to record-specific feature contribution component 122. Record-specific feature contribution component 122 is intended to determine, for each feature of each record of input data records 104, a contribution of the feature to the predicted value for the record as noted in output vector 106.

According to some embodiments, record-specific feature contribution component 122 determines SHapley Additive exPlanation (SHAP) values for each feature of each record of input data records 104. Usage of the SHAP values assumes that records whose features have similar contributions to their respective predicted outputs invoke similar mappings, or regions, of the predictive model. SHAP values may therefore be used to identify regions associated with records.

Component 122 outputs matrix 124 of SHAP values which shares the same dimension as input data records 104. However, rather than including a feature value in each cell of a record, matrix 124 includes a SHAP value indicating a contribution of the corresponding feature value to the value predicted by model 102 for the record. Matrix 124 is input to trained classification model 126 which determines vector 130 of model regions corresponding to each row of matrix 124. Training of classification model 126 according to some embodiments is described in detail below.

Since each row of matrix 124 also corresponds to a record of data records 104, vector 130 also provides the model regions corresponding to each record of data records 104. Data records 104 and vector 130 are input to region-specific data enhancement component 140.

Region-specific data enhancement component 140 adds values of engineered features to each input data record 104 based on its associated model region. Generally, and as will be described in detail below, each region is associated with a set of zero or more engineered features, which may be established during the training of trained enhanced model 160. For a given region, component 140 identifies records of records 104 associated with the region based on vector 130, identifies the set of engineered features associated with the region, derives values for each engineered feature of the set for each record associated with the region, and adds the derived values to each record associated with the region. For each record of records 104 not associated with the given region, component 140 also adds each engineered feature of the set but assigns a default value (as opposed to a record-derived value) to each engineered feature. Component 140 then repeats this process for each identified region, resulting in feature-enhanced input data records 150.

Feature-enhanced input data records 150 are input to trained enhanced model 160, which outputs vector 170 including predictions associated with each record of data records 150. Such predictions are also associated with corresponding rows of input data records 104.

Figure 2:
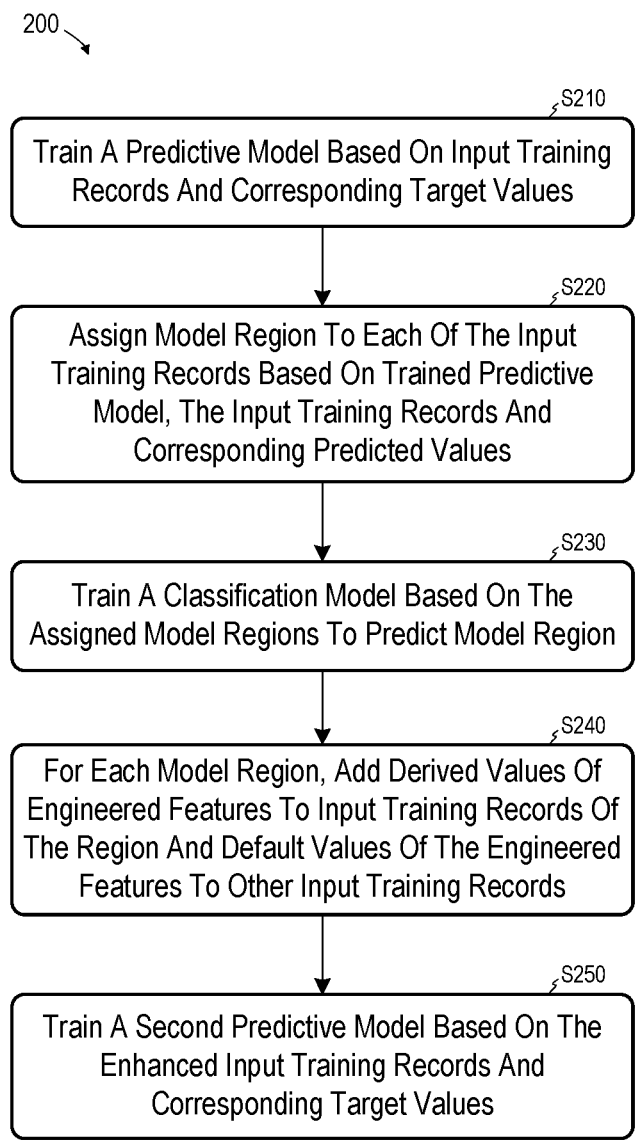
FIG. 2 is a flow diagram of a process to train a classification model and an enhanced predictive model according to some embodiments.

FIG. 2 is a flow diagram of process 200 to train a classification model and an enhanced predictive model according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any one or more processing units, including but not limited to a microprocessor, a microprocessor core, and a microprocessor thread. Embodiments are not limited to the examples described below.

A predictive model is trained at S210 based on input training records and corresponding target values. The input training records are historical records representing a problem whose solution is to be learned by the predictive model.

Figure 3:
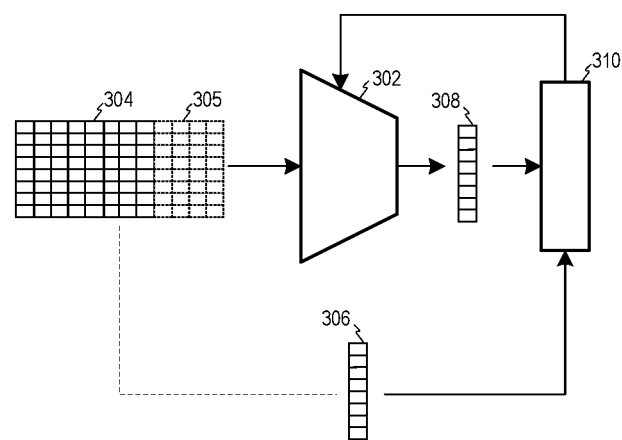
FIG. 3 is a block diagram illustrating training a predictive model using supervised learning and optional engineered features according to some embodiments.

FIG. 3 depicts an architecture to train model 302 at S210 based on input training records 304 and corresponding target values 306. Each of target values 306 corresponds to a respective record of records 304, and is a known solution, or ground truth, corresponding to the values of the respective record. Training records 304 may include global engineered features 305 as is known in the art, but embodiments are not limited thereto.

During training, model 302 outputs vector 308 of predicted values corresponding to each record of input records 304. Loss component 310 determines a loss reflecting a difference between vector 308 and vector 306. The loss may be an L1 loss, an L2 loss, or any other calculated loss. The loss is utilized to modify model 302 in an attempt to minimize the loss. The process repeats and model 302 is iteratively modified in this manner until the loss reaches acceptable levels or training otherwise terminates (e.g., due to time constraints or to the loss asymptotically approaching a lower bound).

Returning to process 200, a model region is assigned to each of the input training records at S220 based on the trained predictive model, the input training records and corresponding predicted values. Assignment of the model regions at S220 first requires determination of the model regions. Next, at S230, a classification model is trained based on the assigned model regions to predict a model region. An example implementation of S220 and S230 will be described below with respect to FIGS. 4-10.

At S240, and for each model region, derived values of region-specific engineered features are added to input training records associated with the region and default values of region-specific engineered features are added to input training records which are not associated with the region. The thus-enhanced input training records, and the corresponding target values used in S210, are then used to train a second predictive model (e.g., model 160) at S250. An example implementation of S220 and S230 will be described below with respect to FIGS. 11 and 12a-12e.

Figure 4:
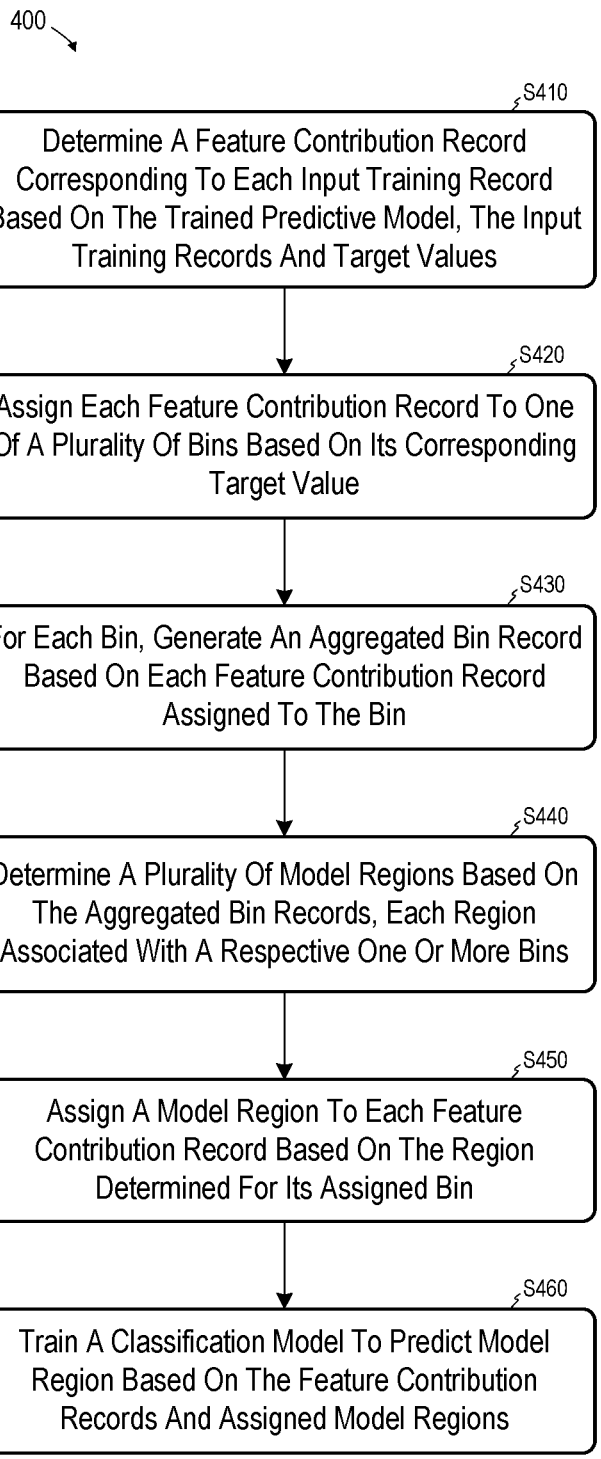
FIG. 4 is a flow diagram of a process to train a classification model according to some embodiments.

Process 400 of FIG. 4 provides determination of model regions, assignment of model regions to input training records, and training a classification model based on the assigned model regions. Accordingly, process 400 may comprise an implementation of S220 and S230 of process 200.

Figure 5:
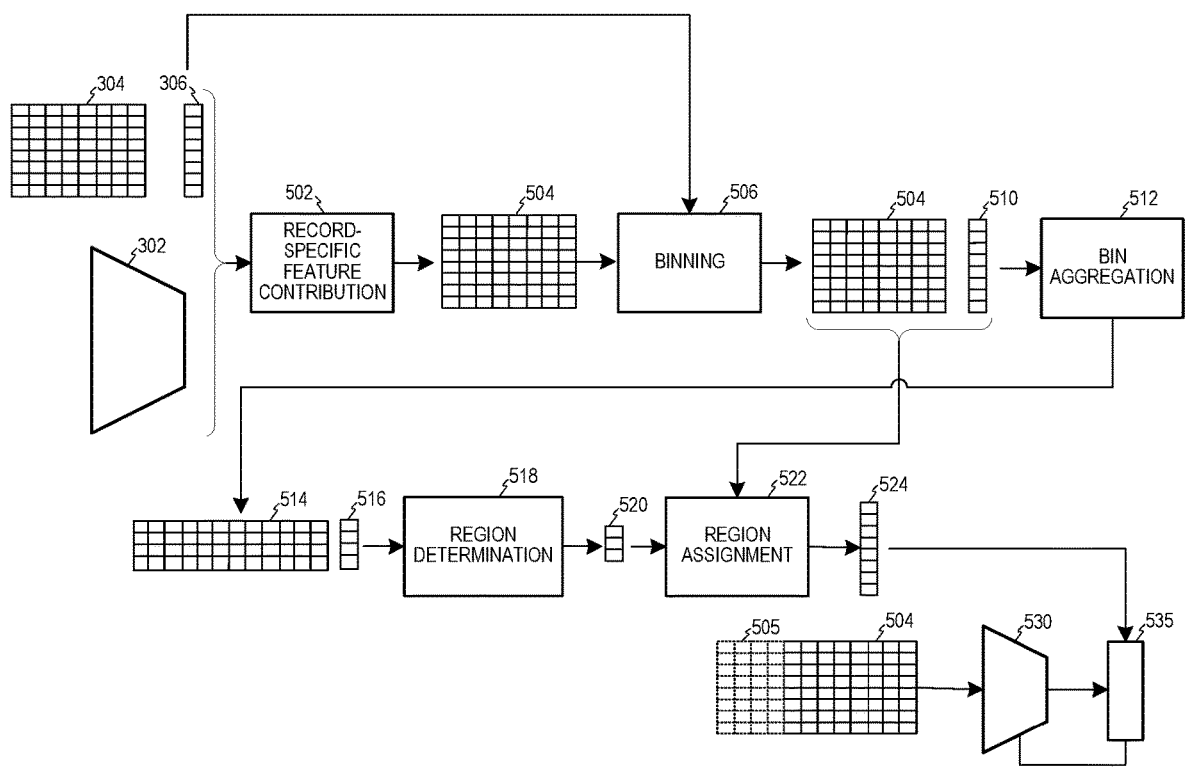
FIG. 5 block diagram illustrating determination of model regions and training a classification model to classify model regions based on input training data according to some embodiments.

At S410, a feature contribution record corresponding to each input training record is determined based on the predictive model trained at S210, the input training records used to train the model, and values predicted by the model based on the input training records. Continuing with the example of FIG. 3, FIG. 5 illustrates input of trained predictive model 302, input training records 304 and model-predicted values 308 to record-specific feature contribution component 502.

Record-specific feature contribution component 502 performs S410 to output feature contribution records 504 corresponding to each input training record 304. Each feature contribution record provides, for each feature of its corresponding input training record, a contribution of the feature to the value predicted by the model based on the input training record. As described above, the feature contribution records include SHAP values representing the contribution of every feature towards each corresponding prediction, thereby enabling interpretation of the underlying patterns and relationships learned by the predictive model.

Figure 6:
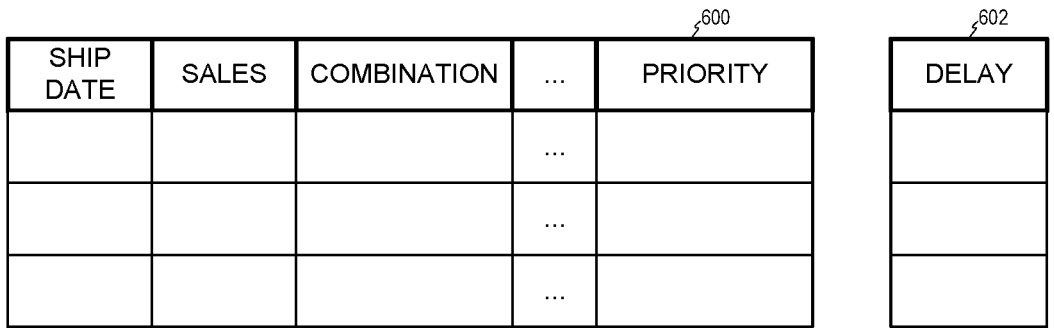
FIG. 6 illustrates input training records and corresponding target values according to some embodiments.

FIG. 6 illustrates an example of input training records 600 and corresponding model-predicted values 602. According to the example, the model was trained at S210 to predict a delay between a planned shipping date and an actual shipping date. Each column of each record 600 represents a feature, and values 602 include the delay predicted by the trained model for each record 600.

Figure 7:
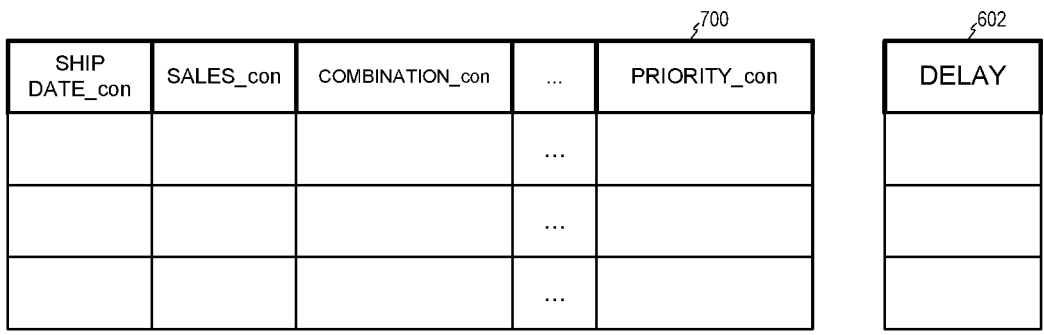
FIG. 7 illustrates feature contribution records corresponding to the FIG. 6 input training records and corresponding target values according to some embodiments.

Each of feature contribution records 700 of FIG. 7 corresponds to one of input training records 600. Each record 700 includes SHAP values for each feature of its corresponding record 600. As also noted, each feature contribution record 700 may be considered associated with the delay 602 predicted by the trained model for its corresponding input training record 600.

Next, at S420, each feature contribution record is assigned to one of a plurality of bins based on its corresponding target value. The target value corresponding to a feature contribution record is the target value associated with the input training record corresponding to feature contribution record. FIG. 5 shows binning component 506 for assigning each feature contribution record 504 to a bin based on target values 306.

In some embodiments, each of the plurality of bins is associated with an exclusive range of target values. At S420, all feature contribution records associated with a target value falling within a range associated with a bin are assigned to that bin. For example, actual delay values 602 may fall within a range of −18 (i.e., 18 days early) to 45 (i.e., 45 days late). This range is divided into ranges (e.g., (−18, −13), (−13, −3), (−3, 2), etc.), each of which corresponds to a bin. Accordingly, each feature contribution record is then assigned to a bin based on its actual delay value 602 and the bin-specific ranges. FIG. 5 shows feature contribution records 504 and vector 510 specifying a bin corresponding to each record 504.

The feature contribution records assigned to each bin are aggregated into an aggregated bin record at S430. S430 may comprise any suitable type of record aggregation functions that are or become known. According to some embodiments, each feature contribution column is subjected to one or more aggregations such that the aggregated bin record includes one or more columns for each feature contribution.

Figure 8:
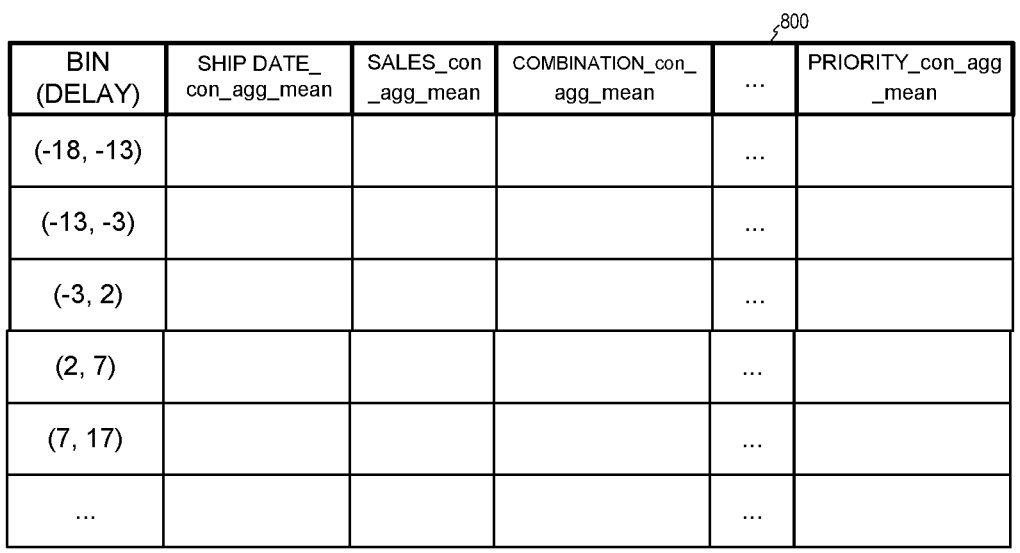
FIG. 8 illustrates bins of aggregated feature contribution records according to some embodiments.

FIG. 8 illustrates an example of aggregated bin records 800 according to some embodiments. The feature contribution records of each bin have been aggregated into a single aggregated bin record including one column per aggregation function per feature. For example, if records 700 include 213 columns and each feature is subjected to three different aggregations at S430, then bin records 800 consists of 639 columns.

FIG. 5 shows bin aggregation component 512 receiving feature contribution records 504 and corresponding bin vector 510 and outputting aggregated bin record 514 and bin-identifying vector 516. Bin-identifying vector 516 indicates the bin with which each of records 514 is associated.

A plurality of model regions are determined at S440 based on the aggregated bin records. For example, region determination component 518 may determine a plurality of model regions based on aggregated bin records 514. Region determination component 518 further determines, using bin-identifying vector 516, one or more bins associated with each determined model region and outputs vector 520 specifying the determined the bin-to-model region mappings. The bin associated with an aggregated bin record will map to a single determined model region, and each determined model region will include one or more bins.

The model regions may be determined at S440 based on similarities between the aggregated bin records. Since each aggregated bin record is derived based on certain feature contribution records, two similar aggregated bin records may be consider as having similar constituent feature contribution records. Moreover, the presence of similar feature contribution records indicates that the trained model maps their corresponding data records similarly from input variables to the target.

In some embodiments, determination of the plurality of model regions may comprise any implementation for grouping the aggregated bin records according to similarity with one another. For example, a similarity correlation matrix may be determined, and m candidate decision boundary regions may be obtained from the matrix. The candidate decision boundary regions are then ranked, and model regions are determined automatically or manually based on the ranking and candidate decision boundary regions.

Table 900 of FIG. 9 is an example of a similarity correlation matrix according to some embodiments. Each row represents a bin and the columns indicate its corresponding correlation to other bins, as calculated based on the corresponding aggregated bin vectors and. A correlation of 1 indicates cells in which the row and the column represent the same bin.

According to some embodiments, the candidate decision boundary regions are determined by grouping bins sharing a correlation level equal or above a defined correlation threshold value. This grouping may utilize multiple correlation threshold values. For example, table 1000 of FIG. 10 includes a list of candidate decision boundary regions generated by applying correlation threshold values of 0.8 and 0.95 to the values of table 900.

The candidate decision boundary regions and related rankings may be manually reviewed, with the top n determined as separable model regions. Alternatively, the top n candidate decision boundary regions may be automatically selected as separable model regions. Each of the selected candidate decision boundary regions may then be further analyzed based on the similarity correlation matrix to generate a ranked score for each candidate decision boundary indicating the likelihood for a classification algorithm to achieve high accuracy in classifying data as within the or outside the candidate decision boundary region.

Generation of the ranked score for each candidate decision boundary region may include calculating a mean correlation value of bins identified existing within the candidate decision boundary, and calculating a mean correlation value of bins identified existing outside the candidate decision boundary region. The ranked score is the magnitude of the difference between these two mean correlation values, which is directly proportional to the likelihood for a classification algorithm to achieve high accuracy in classifying input data as within the or outside the candidate decision boundary region. Accordingly, the selected candidate decision boundary regions are ranked according to the differences between their two mean correlation values.

The rankings and candidate decision boundary list may be reviewed by a user to select n model regions. Alternatively, the candidate decision boundary list is placed in descending order based on ranking score. The top n model regions in the list are then automatically selected.

Returning to process 400, one of the determined model regions is assigned to each feature contribution record at S450 based on the region determined for the bin to which the feature contribution record is assigned. For example, region assignment component 522 receives feature contribution records 504 and bin-identifying record 510 identifying the bin to which each of feature contribution records 504 is assigned. Region assignment component 522 also receives vector 520 specifying the determined the bin-to-model region mappings. From these inputs, region assignment component 522 is able to generate vector 524 indicating a model region for each of feature contribution records 504.

A classification model is trained at S460 to predict a model region. The classification model is trained based on the feature contribution records determined at S410 and the model regions assigned thereto at S450.

FIG. 5 illustrates training of classification model 530 based on feature contribution records 504 and on vector 524 indicating a model region for each of feature contribution records 504. Vector 524 comprises ground truth data which loss layer 535 compares against predicted values output by model 530 during training. Training continues until the loss associated with operation of model 530 is satisfactory. In this regard, feature contribution records 504 may be enhanced with engineered features 505 in an attempt to improve the accuracy of trained model 530 as described above and as is known in the art. Unlike record-specific feature engineering as otherwise described herein, engineered features 505, is utilized, are derived for each of records 504 similarly.

Accordingly, at the conclusion of process 400, a classification model is obtained which may take a feature contribution record associated with an input data record and a predictive model as input and output a model region associated with the predicted model and the input data record.

Figure 11:
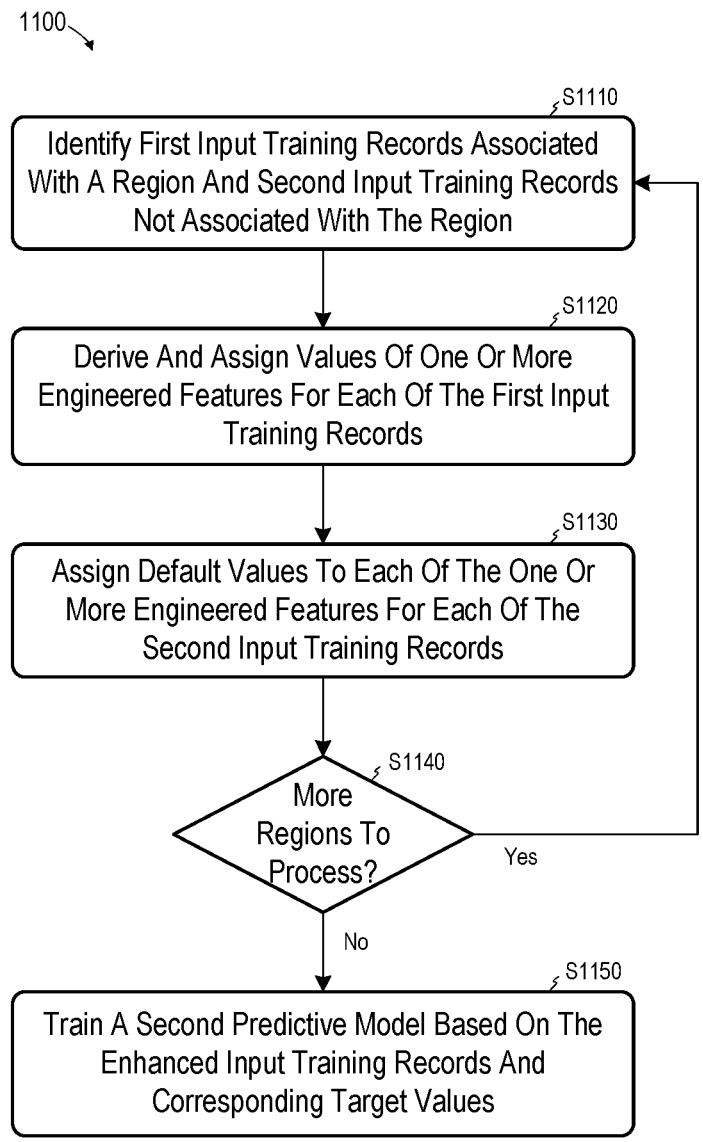
FIG. 11 is a flow diagram of a process to train an enhanced predictive model using region-specific engineered features according to some embodiments.

Process 1100 of FIG. 11 provides record- and region-specific enhancement of input training records, and training of a second predictive model based on the enhanced input training records. Accordingly, process 1100 may comprise an implementation of S240 and S250 of process 200.

Initially, at S1110, input training records associated with a particular model region are identified. Input training records which are not associated with the particular model region are also identified. Continuing the above example, vector 524 output at S450 indicates a model region for each of feature contribution records 504. Since each of feature contribution records 504 corresponds to a given one of input training records 304, vector 524 also indicates a model region corresponding to each of input training records 304. Accordingly, vector 524 may be used at S1110 to identify ones of input training records 304 associated with a particular model region and ones of input training records 304 not associated with the particular model region.

Figure 12A:
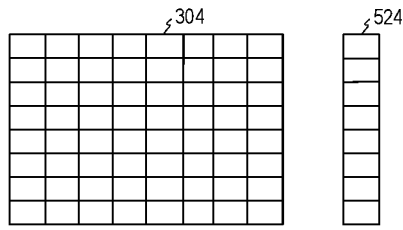
FIGS. 12a through 12e illustrate enhancement of input data based on region-specific engineered features according to some embodiments.
Figure 12B:
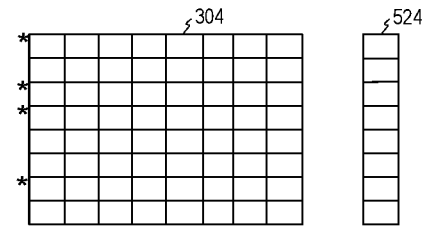

FIG. 12a includes vector 524 and input training records 304 for illustrating an example of process 1100 according to some embodiments. The asterisks of FIG. 12b indicate four records of input training records 304 which have been identified at S1110, based on vector 524, as associated with a given model region (e.g., model region 1).

At S1120, values of one or more engineered features are derived for and assigned to each of the input training records identified as being associated with the particular model region. At S1130, default values of the one or more engineered features are assigned to each of the input training records identified as not being associated with the particular model region.

Embodiments therefore assume a determination of a set of zero or more engineered features for each identified model region. The sets of engineered features may be determined manually or automatically based on any techniques that are or become known to define engineered features for training a model using supervised learning. The set of engineered features for an identified model region may be determined based at least in part on a predictive accuracy associated with the model region. The predictive accuracy may be determined by comparing the ground truth values 306 and the predicted values 308 associated with the input training records associated with the model region. One or more model regions may be associated with zero engineered features because the one or more model regions are determined to be associated with a high accuracy.

Figure 12C:
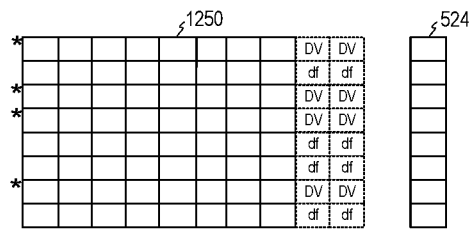

FIG. 12c shows enhanced input training records 1250 after a first iteration of S1120 and S1130. As shown, derived values (DV) of two engineered features have been added to each of the asterisked input training records identified as being associated with the current model region. Also, default values (df) of the two engineered features have been added to each of the non-asterisked input training records identified as not being associated with the current model region. The default values may be identical for each non-asterisked input training record and may be selected so as to minimally affect the determination of a predicted value for those records.

Figure 12D:
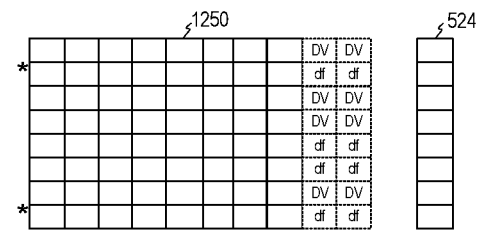

Flow proceeds to S1140 and returns to S1110 if additional model regions remain to be processed. S1110 therefore includes identification of input training records associated with a next model region, and identification of input training records not associated with the next model region. The asterisks of FIG. 12d indicate two records of input training records 304 which have been identified during this second iteration of S1110 as associated with a next model region (e.g., model region 2). The non-asterisked input training records 304 of FIG. 12d are therefore identified as not associated with the next model region.

Values of a next one or more engineered features are then derived for and assigned to each of the model region input training records at S1120, and default values of the next one or more engineered features are assigned at S1130 to each of the input training records identified as not being associated with the model region.

Figure 12E:
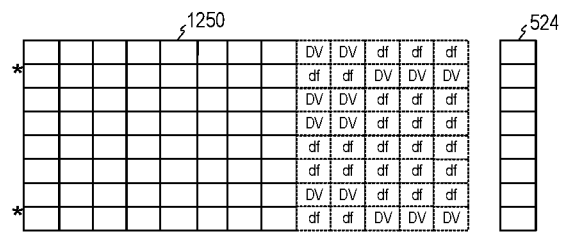

It will be assumed that the set of engineered features associated with the next model region includes three engineered features. FIG. 12e shows enhanced input training records 1250 after the second iteration of S1120 and S1130. Derived values (DV) of three engineered features have been added to each of the two asterisked input training records identified as being associated with the next model region. Also, default values (df) of the three engineered features have been added to each of the non-asterisked input training records identified as not being associated with the next model region.

Flow continues as described above until all model regions have been processed and flow therefore proceeds to S1150. As mentioned, one or more model regions may be associated with no engineered features. Such model regions may be ignored in the determination at S1140 since there is no need to add engineered features with respect to those model regions.

At S1150, the enhanced input training records generated via the prior steps of process 1100 and corresponding target values are used to train a second predictive model. With respect to the above example, enhanced input training records 1250 and ground truth values 306 may be used to train a second predictive model as described above. The trained second predictive model may then be deployed as model 160 of the FIG. 1 pipeline.

Figure 13:
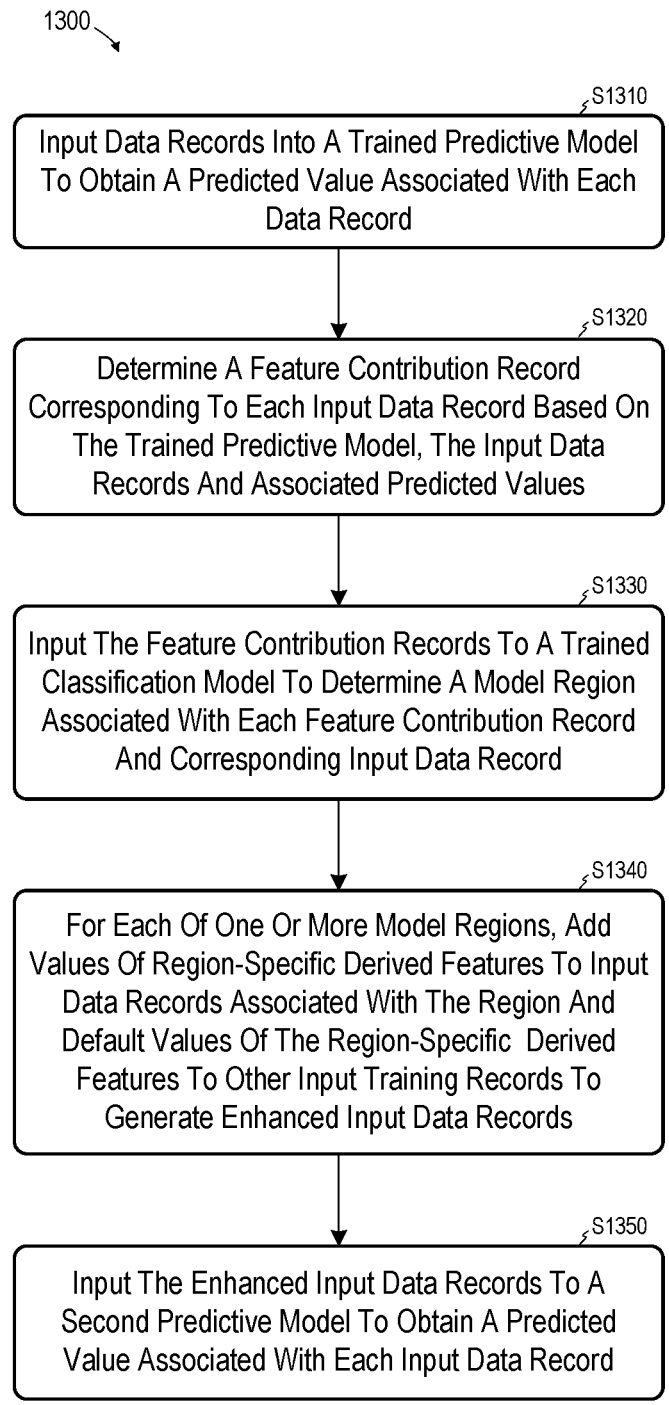
FIG. 13 is a flow diagram to generate predictive values associated with input data records based on a predictive model, a classification model to classify record-specific model regions, enhanced input data records including record- and region-specific engineered features, and an enhanced predictive model trained according to some embodiments.

Deployment of a pipeline using the trained networks of the above example will now be described with respect to process 1300 of FIG. 13. At S1310, data records are input into a trained predictive model to obtain a predicted value associated with each data record. The trained predictive model may comprise trained model 302 described above, and the input data records may comprise records other than those used to train model 302 but include the same features (e.g., columns) as the training records. Therefore, if the training records were enhanced with global derived features then then the input data records are similarly enhanced prior to input to the trained model.

A feature contribution record corresponding to each input data record is determined at S1320 based on the trained predictive model 302, the input data records and the predicted values generate at S1310. As described above, the feature contribution records may comprise SHAP values for each feature of each record of the input data records.

The feature contribution records are input to trained classification model 530 at S1330 to determine a model region associated with each feature contribution record and corresponding input data record. In a case that classification model 530 was trained using engineered features 505, such engineered features are derived for and added to each feature contribution record prior to input to classification model 530 at S1330.

S1330 results in a model region associated with each input data record. At S1340, and for each model region, values of region-specific engineered features are derived for and added to input data records associated with the region and default values of the engineered features are added to input data records not associated with the region. The engineered features specific to each region are the same region-specific engineered features used to enhance the data records which were used to train a second predictive model at S1150.

The thus-enhanced input data records are input to the trained second predictive model at S1350. The trained second predictive model outputs a predicted value associated with each enhanced input data record. Since each enhanced input data record corresponds to one of the input data records originally-input at S1310, each predicted value output at S1350 is also a predicted value corresponding to one of the original input data records.

Figure 14:
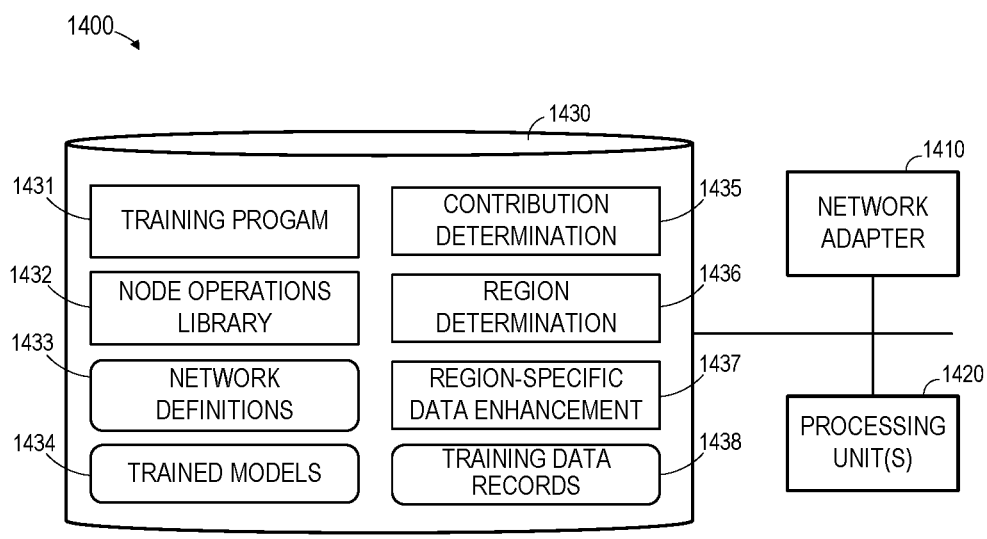
FIG. 14 is a block diagram of a system to train a classification model and an enhanced predictive model according to some embodiments.

FIG. 14 illustrates computing system 1400 according to some embodiments. System 1400 may comprise a computing system to facilitate the design and training of a supervised learning networks as is known in the art. Computing system 1400 may comprise a standalone system, and one or more elements of computing system 1400 may be located in the cloud.

System 1400 includes network adapter 1410 to communicate with external devices via a network connection. Processing unit(s) 1420 may comprise one or more processors, processor cores, or other processing units to execute processor-executable program code. In this regard, storage system 1430, which may comprise one or more memory devices (e.g., a hard disk drive, a solid-state drive), stores processor-executable program code of training program 1431 which may be executed by processing unit(s) 1420 to train one or more networks as described herein.

Training program 1431 may utilize node operations library 1432, which includes program code to execute various operations associated with node operations as defined in network definitions 1433. According to some embodiments, computing system 1400 provides interfaces and development software (not shown) to enable development of training program 1431 and generation of network definitions 1433 which define the structure of predictive networks and model region-classification networks trained as described herein. Trained models 1434 include the mathematical representations of such trained models.

Storage device 1430 also includes program code of contribution determination component 1435 to determine record-specific feature contributions of training data records 1438 as described herein, region determination component 1436 to determine model regions based on the feature contribution records, and region-specific data enhancement component 1437 to enhance training data records 1438 based on the determined model regions to train a second predictive network as described herein.

Figure 15:
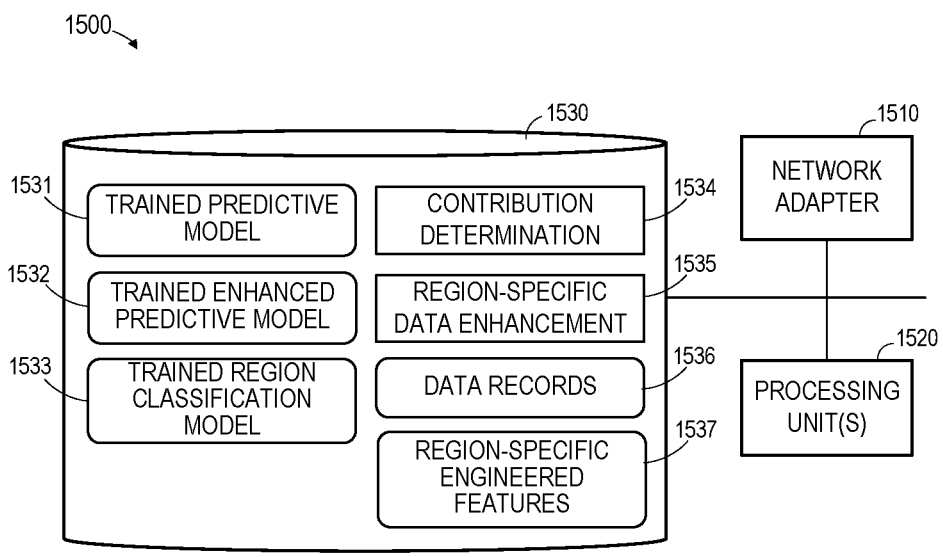
FIG. 15 is a block diagram of a system to generate predictive values associated with input data records based on a predictive model, a classification model to classify record-specific model regions, enhanced input data records including record- and region-specific engineered features, and an enhanced predictive model trained according to some embodiments.

FIG. 15 illustrates computing system 1500 to deploy models trained as described herein according to some embodiments. System 1500 may comprise a standalone system, and one or more elements of computing system 1500 may be located in the cloud. The software and data components of system 1500 may be implemented by system 1400, in which case system 1400 may provide training and deployment of a pipeline of networks as described.

Data representing the learned operations of trained predictive model 1531 may be analogous to trained model 102 as described above, and data representing the learned operations of trained enhanced predictive model 1532 may be analogous to trained model 160. Trained region classification model 1533 may be executed to determine model regions as described with respect to model 126.

Storage device 1530 also includes program code of contribution determination component 1534 to determine record-specific feature contributions of input data records 1536, and region-specific data enhancement component 1535 to enhance input data records 1536 based on the determined model regions and on specified region-specific engineered features 1537 as described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
a storage device storing input data records and target values respectively corresponding to each of the input data records; and
a processing unit to execute processor-executable program code to cause the system to:
input the data records to a first trained predictive model comprising a network of neurons forming a directed and weighted graph to obtain a predicted value associated with each input data record;
from a plurality of model regions of the first trained predictive model, determine a model region associated with each of the input data records based on the first trained predictive model, the input data records and the predicted values, wherein each of the plurality of model regions of the first trained predictive model represents a respective mapping of the first trained predictive model from a respective space of input values to a respective space of predicted values;
generate enhanced input data records by, for each model region, adding derived values of engineered features associated with the model region to input data records associated with the model region and default values of the engineered features associated with the model region to input data records not associated with the model region; and
input the enhanced input data records to a second trained predictive model to obtain an enhanced predicted value associated with each input data record.

2. A system according to claim 1, wherein determination of a model region associated with each of the input data records based on the first trained predictive model, the input data records and the predicted values comprises:
determining a contribution of each feature of each input data record to the predicted value corresponding to the input data record; and
determination of the model region associated with each of the input data records based on the determined contributions.

3. A system according to claim 2, wherein determination of the contributions comprises:
determination of SHAP values for each feature of each input data record based on the first trained predictive model, the input data records and the predicted values, and
wherein determination of the model region associated with each of the input data records based on the determined contributions comprises:
inputting the SHAP values for each feature of each input data record to a trained classification model to generate a predicted model region associated with each feature contribution record.

4. A system according to claim 1, wherein engineered features associated with a first one of the plurality of model regions are different from engineered features associated with a second one of the plurality of model regions.

5. A method comprising:
inputting data records to a first trained predictive model comprising a network of neurons forming a directed and weighted graph to obtain a predicted value associated with each input data record;
from a plurality of model regions of the first trained predictive model, determining a model region associated with each of the input data records based on the first trained predictive model, the input data records and the predicted values, wherein each of the plurality of model regions of the first trained predictive model represents a respective mapping of the first trained predictive model from a respective space of input values to a respective space of predicted values;
generating enhanced input data records by, for each model region, adding derived values of engineered features associated with the model region to input data records associated with the model region and default values of the engineered features associated with the model region to input data records not associated with the model region; and
inputting the enhanced input data records to a second trained predictive model to obtain an enhanced predicted value associated with each input data record.

6. A method according to claim 5, wherein determination of a model region associated with each of the input data records based on the first trained predictive model, the input data records and the predicted values comprises:
determining a contribution of each feature of each input data record to the predicted value corresponding to the input data record; and
determination of the model region associated with each of the input data records based on the determined contributions.

7. A method according to claim 6, wherein determination of the contributions comprises:
determination of SHAP values for each feature of each input data record based on the first trained predictive model, the input data records and the predicted values, and
wherein determination of the model region associated with each of the input data records based on the determined contributions comprises:
inputting the SHAP values for each feature of each input data record to a trained classification model to generate a predicted model region associated with each feature contribution record.

8. A method according to claim 5, wherein engineered features associated with a first one of the plurality of model regions are different from engineered features associated with a second one of the plurality of model regions.

9. A method comprising:
training a first predictive model comprising a network of neurons forming a directed and weighted graph based on input training records and target values respectively corresponding to each of the input training records, to generate a trained first predictive model;
assigning a model region to each of the input training records based on the trained first predictive model and the input training records, where each of the model regions represents a respective mapping of the trained first predictive model from a respective space of input values to a respective space of predicted values;
training a classification model based on the model regions assigned to each of the input training records;
generating enhanced input training records by, for each model region, adding derived values of region-specific engineered features to the input training records assigned to the model region and default values of the region-specific engineered features to the input training records not assigned to the model region; and
training a second predictive model based on the enhanced input training records and the target values.

10. A method according to claim 9, wherein assigning a model region to each of the input training records based on the trained first predictive model and the input training records comprises:

determining a feature contribution record corresponding to each input training record based on the trained first predictive model, the input training records and the target values; and
assigning a model region to each of the input training records based on its corresponding feature contribution record.

11. A method according to claim 10, wherein assigning a model region to each of the input training records based on its corresponding feature contribution record comprises:
assigning each feature contribution record to one of a plurality of bins based on the target value associated with its corresponding input training record;
for each bin, generating an aggregated bin record based on each feature contribution record assigned to the bin;
determining a plurality of model regions based on the aggregated bin records, where each region comprises a respective one or more of the plurality of bins;
assigning a model region to each feature contribution record based on the model region comprising the bin to which the feature contribution record is assigned; and
assigning a model region to each of the input training records based on a model region assigned to its corresponding feature contribution record.

12. A method according to claim 11, wherein determining a plurality of model regions based on the aggregated bin records comprises determining a similarity between each pair of the aggregated bin records.

* * * * *